United States Patent
Mills et al.

(10) Patent No.: US 7,428,261 B2
(45) Date of Patent: Sep. 23, 2008

(54) CROSS-SYSTEM INTERFERENCE CANCELLATION FOR MULTICARRIER CDMA AND OFDM

(75) Inventors: Diane G. Mills, Wilmington, MA (US); Michael J. Kotrlik, Nashua, NH (US); Kari M. Karwedsky, Merrimack, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 909 days.

(21) Appl. No.: 10/482,599

(22) PCT Filed: Jun. 30, 2003

(86) PCT No.: PCT/US03/20484

§ 371 (c)(1),
(2), (4) Date: Dec. 23, 2003

(87) PCT Pub. No.: WO2004/100416

PCT Pub. Date: Nov. 18, 2004

(65) Prior Publication Data

US 2004/0247020 A1    Dec. 9, 2004

Related U.S. Application Data

(60) Provisional application No. 60/465,027, filed on Apr. 24, 2003.

(51) Int. Cl.
*H04B 1/00* (2006.01)
*H03D 1/04* (2006.01)

(52) U.S. Cl. .................. 375/148; 375/144; 375/346

(58) Field of Classification Search ............ 375/148, 375/260, 144, 346, 348; 370/206, 342; 329/320
See application file for complete search history.

(56) References Cited

U.S. PATENT DOCUMENTS

| | | | | |
|---|---|---|---|---|
| 5,533,013 A * | 7/1996 | Leppanen | | 370/342 |
| 6,115,409 A * | 9/2000 | Upadhyay et al. | | 375/144 |
| 6,128,276 A * | 10/2000 | Agee | | 370/208 |
| 6,359,923 B1 * | 3/2002 | Agee et al. | | 375/130 |
| 6,834,109 B1 * | 12/2004 | Pare et al. | | 379/416 |
| 7,023,265 B1 * | 4/2006 | Helard et al. | | 329/320 |
| 7,161,927 B2 * | 1/2007 | Wu et al. | | 370/342 |
| 2003/0072291 A1 * | 4/2003 | Brunel | | 370/342 |
| 2004/0013174 A1 * | 1/2004 | Nuutinen et al. | | 375/148 |
| 2004/0184399 A1 * | 9/2004 | Chiou | | 370/206 |

OTHER PUBLICATIONS

Hou et al., Adative Narrowband Interference Rejection in DS-CDMA Systems: A Scheme of Parallel Inteference Cancellers, Jun. 2006, IEEE Journal On Selected Areas in Communications, vol. 19, pp. 1103-1114.*
Karwedsky, K., Multicarrier CDMA with Cross-system Interference Cancellation, Mar. 21-25, 2004, wireless Communications and Networking Conference, vol. 3, pp. 1823-1827.*

(Continued)

*Primary Examiner*—Mohammad Ghayour
*Assistant Examiner*—Lawrence B Williams
(74) *Attorney, Agent, or Firm*—Vern Maine & Associates

(57) ABSTRACT

Interference cancellation techniques for use in a wireless multicarrier communications system where signals from multiple wireless networks might be present and interfering with the detection and demodulation processes are disclosed. Interference cancellation is applied to the interfering network before removing same-system interference. By removing the contribution of all interfering systems' from a receiver's aggregate signal, the receiver is capable of detection and demodulation. Performance can be further improved by including an additional level of interference cancellation within the system of interest to separate the individual user of interest.

20 Claims, 8 Drawing Sheets

OTHER PUBLICATIONS

Mills et al., Multicarrier CDMA with Cross-System Interference Cancellation, Mar. 21-25, 2004, Wireless Communications and Networking Conference, Vo. 3, pp. 1823-1827.*

Sharma, Naresh et al., "Multiuser Demodulation and Interative Decoding for Frequency-Hopped Networks", IEEE Transactions on Communications, Aug. 2001, pp. 1437-1446, vol. 49, No. 8.

Weitzen, Jay, "Digital Modulation III QAM Introduction to Communication", pp. 1-37, date unknown.

Halford, Karen et al., "Multistage Multiuser Detection for FHMA", IEEE Transactions on Communications, Sep. 2000, pp. 1550-1562, vol. 48, No. 9.

Litwin, Louis, "OFDM: An Introduction to Multicarrier Modulation", IEEE Potentials, Apr./May 2000, pp. 36-38.

Hara, Shinsuke et al., "Overview of Multicarrier CDMA", IEEE Communications Magazine, Dec. 1997, pp. 126-133.

Wang, Zhengdao et al. "Wireless Multicarrier Communications", IEEE Signal Processing Magazine, May 2000, pp. 29-48.

Fazel, Khaled, "Performance of CDMA/OFDM for Mobile Communication System", IEEE ICUPC Conference, 1993, pp. 975-979.

Kaiser, Stefan et al., "Multi-Carrier CDMA with Interative Decoding and Soft-Interference Cancellation", IEEE, 1997, pp. 6-10.

Sugimoto, Hiroki et al., "Mapping Functions for Successive Interference Cancellation in CDMA", IEEE VTC, 1998, pp. 2301-2305.

Oyama, Takashi et al., "Performance Comparison of Multi-Stage SIC and Limited Tree-Search Detection in CDMA", IEEE VTC, 1998, pp. 1854-1858.

* cited by examiner

CROSS-SYSTEM INTERFERENCE CANCELLATION FOR MULTICARRIER CDMA AND OFDM

RELATED APPLICATIONS

This application is a 371 of PCT/US03/20484 filed Jun. 30, 2003 which claims the benefit of U.S. Provisional Application No. 60/465,027, filed Apr. 24, 2003, which is herein incorporated in its entirety by reference.

FIELD OF THE INVENTION

The invention relates to communication systems, and more particularly, to multiuser communication systems and interference cancellation.

BACKGROUND OF THE INVENTION

Wireless networks are employed for communication between various devices, such as cell phones and computers. Digitally modulated signals such as binary phase shift keyed and quadrature phase shift keyed signals are transmitted between nodes of the network. Examples include satellite communications networks where terminals transmit through satellite transponders, terrestrial systems where terminals transmit through repeating towers, and indoor local area networks where terminals transmit through central repeating elements.

Computer elements connected to these networks provide a variety of user services. Examples include telephone traffic with digital voice encoding, video conferencing, local and wide area computer network connectivity, and internet service. In such applications, it is desirable to maximize the network traffic capacity in a given bandwidth in the presence of interference and noise. To that end, a variety of modulation and coding schemes exist for efficiently partitioning the network elements into communication channels.

For example, frequency domain multiple access (FDMA) schemes assign each network terminal to a separate, non-overlapping frequency band. Time domain multiple access (TDMA) schemes assign each terminal to a separate non-overlapping time slot. Code division multiple access (CDMA) schemes assign each terminal to a separate modulating waveform so that the cross correlation between each terminal is negligible. Orthogonal frequency division multiplexing (OFDM) schemes break up a single wideband channel into many narrowband channels. Each channel transmits a small piece of information on a different subcarrier that together with the other channels comprises a larger block of information for a single user. The bands are selected so adjacent bands do not interfere with each other.

New, emerging wireless networking systems based on OFDM, networking standard 802.11, and multicarrier code division multiple access (MC-CDMA) are increasing in popularity. The increased number of wireless local area networks deployed in the likes of offices, apartment buildings, homes, and dormitories increases the potential for performance degradation due to multiuser interference (sometimes referred to as multi-access interference) when the systems are operating simultaneously in the same frequency band with similar modulation and spreading methods.

More specifically, a real world multiuser system includes a number of independent users simultaneously transmitting signals. Each of these transmissions are associated with real-time problems of multipath and multiuser interference that manifest in each of the received signals. Multipath occurs when a signal proceeds to its intended receiver along not one but many paths so that the receiver encounters echoes having different and randomly varying delays and amplitudes. Same-system interference refers to signals received from other users in the same system. In addition, where two or more networks are visible to the receiver, cross-system interference refers to signals received from other network systems.

A multiuser detection (MUD) receiver can be used to jointly demodulate co-channel interfering digital signals. In general, MUD refers to the detection of data in non-orthogonal multiplexes. MUD processing increases the number of information bits available per chip or signaling dimension for interference limited systems. Optimal MUD based on the maximum likelihood principle operates by comparing the received signal with the entire number of possibilities that may have occurred at the ensemble of transmitters, to give rise to the waveform received at the receiver. After implementing such a comparison, the optimal MUD chooses the most likely possibility as the estimate of the transmitted symbols from all transmitters.

However, for multiuser detectors that examine a larger capacity of signal, the computations are complex and time-consuming, thus making real-time operation impractical. Reduced complexity approaches based on conventional tree-pruning algorithms help to some extent. However, performance of such multiuser detection algorithms degrades as the parameter M (pruning factor) is decreased, but M governs the number of computations required. Thus, to combat improper pruning, basic tree-pruning must ensure that M is large enough. As a result, conventional pruning methods are still associated with increased complexity, particularly when the number of interfering signals is moderate to large.

In some cases, the multiuser interference can be so severe that the signals are not detectable by conventional single-user demodulation (such as matched filters, which typically treat other-user interference as noise), conventional multiuser demodulation (such as optimal MUD, or minimum mean-square error MUD), and iterative MUD decoding methods (such as turboMUD). Same-system interference cancellation techniques can be used to generally improve the performance of multiuser communication systems, where the number of users is less than the dimensions available to the common channel. However, conventional multiuser detection techniques are unable to demodulate co-channel signals in an overloaded environment (when the number of users is greater than the number of dimensions available to the common channel), or when signals of more than one network system are received (cross-system interference).

What is needed, therefore, are techniques that enable interference cancellation in multicarrier communication systems, and particularly in systems where two or more networks are visible. Such techniques would increase the allowable number of simultaneous network users without significant degradation of performance. Such techniques would also facilitate the implementation of multiple co-located wireless networks without pre-installation knowledge of any existing systems or coordination between networks.

BRIEF SUMMARY OF THE INVENTION

One embodiment of the present invention provides an interference cancellation system that is adapted to receive a signal in a wireless multicarrier application (e.g., MC-CDMA), where the signal includes content from a target system as well as one or more interfering systems. The interference cancellation system includes an other-system interference cancellation section that is adapted to remove interference contributed from the one or more interfering systems, and to output an external interference-cancelled signal. An optional same-system interference cancellation system can be operatively coupled to the other-system interference cancellation section, and is adapted to remove interference contributed from the target system, and to output an external and internal interference-cancelled signal. The interference cancellation system may further include an iteration controller that is adapted to receive data estimates from at least one of the interference cancellation systems, and to cause cancellation processing performed by those systems to repeat a number of times based on the received data estimates and a pre-defined rule of iteration.

Another embodiment of the present invention provides an interference cancellation system that is adapted to receive a signal in a multicarrier communication application, where the signal includes content from a target system as well as an interfering system. In this embodiment, the system includes a de-spreading module that is adapted to de-spread estimates of data bits transmitted by the interfering system pursuant to a known spreading code of the interfering system. A decision module is adapted to determine values for actual data bits transmitted by the interfering system based on the estimated data bits, thereby providing a vector of actual data bit estimates for the interfering system. A re-generate signal module is adapted to re-spread the vector of actual data bit estimates pursuant to the known spreading code of the interfering system, and to re-apply the known channel response, thereby providing an estimate of the interfering system signal. The particular embodiment may further include a subtracting module that is adapted to subtract the estimate of the interfering system signal from the received signal, thereby providing a signal that is external interference-cancelled.

Another embodiment of the present invention provides an interference cancellation system that is adapted to receive a signal in a multicarrier communication application, where the signal includes content from a target system as well as an interfering system. In this embodiment, the system includes a channel equalizer module that is adapted to equalize the received signal based on a known channel response of the interfering system, thereby providing estimates of data symbols transmitted by the interfering system. A de-spreading module is adapted to de-spread the estimates of the data symbols pursuant to a known spreading code of the interfering system, and a symbol decision module is adapted to determine values for actual data symbols transmitted by the interfering system based on the estimated data symbols, thereby providing a vector of actual data symbol estimates for the interfering system. A re-spreading module is adapted to re-spread the vector of actual data symbol estimates pursuant to the known spreading code of the interfering system, and an apply channel module is adapted to re-apply the known channel response of the interfering system, thereby providing an estimate of the interfering system signal. A subtracting module is adapted to subtract the estimate of the interfering system signal from the received signal, thereby providing a signal that is external interference-cancelled.

This particular embodiment may further include an orthogonal frequency division multiplexing (OFDM) de-modulation section that is adapted to remove a cyclic prefix from the received signal, and to compute an FFT of the received signal to generate a frequency domain representation of the received signal that can be provided to the equalization module for subsequent processing. A detection module may be included that is adapted to demodulate the signal that is external interference-cancelled using multiuser detection capability, thereby providing a signal of interest. The target system and each interfering system can be, for example, an MC-CDMA system having a known number of total users, with each system having the same known spreading code. Note, however, that each received system can have a different spreading code, provided the different codes can be estimated or are otherwise known. Likewise, each system may have the same or different number of users, provided that number of users for each system can be estimated or is otherwise known. A de-mapping module may be included that is configured to de-map the estimates of the data symbols from their subcarriers prior to applying the estimates to the de-spreading module. Likewise, a re-mapping module may be included that is configured to re-map the actual data symbol estimates provided by the re-spreading module to their subcarriers.

Another variation on this particular embodiment includes a channel equalizer module that is adapted to equalize the signal that is external interference-cancelled based on a known channel response of the target system, thereby providing estimates of data symbols transmitted by the target system. A de-spreading module is adapted to de-spread the estimates of data symbols transmitted by the target system pursuant to a known spreading code of the target system, and a decoding module is adapted to decode the estimates of data symbols transmitted by the target system, according to transmitter encoding of the target system, thereby providing a signal of interest.

Still another variation on this particular embodiment includes a channel equalizer module that is adapted to equalize the signal that is external interference-cancelled based on a known channel response of the target system, thereby providing estimates of data symbols transmitted by the target system. A de-spreading module is adapted to de-spread the estimates of data symbols transmitted by the target system pursuant to a known spreading code of the target system, and a symbol decision module is adapted to determine values for actual data symbols transmitted by the target system based on the estimated data symbols, thereby providing a vector of actual data symbol estimates for the target system. A re-spreading module is adapted to re-spread the vector of actual data symbol estimates pursuant to the known spreading code of the target system, and an apply channel module is adapted to re-apply the known channel response of the target system, thereby providing an estimate of the target system signal. A subtracting module is adapted to subtract the estimate of the target system signal from the signal that is external interference-cancelled, thereby providing a signal that is external and internal interference-cancelled.

In one such embodiment, the system further includes a detection module that is adapted to demodulate the signal that is external and internal interference-cancelled using multiuser detection capability, thereby providing a signal of interest. In another such embodiment, the system further includes a channel equalizer module that is adapted to equalize the signal that is external and internal interference-cancelled based on a known channel response of the target system, thereby providing estimates of data symbols transmitted by the target system. A de-spreading module is adapted to de-spread the estimates of data symbols transmitted by the target system pursuant to a known spreading code of the target system, and a decoding module is adapted to decode the estimates of data symbols transmitted by the target system, according to transmitter encoding of the target system, thereby providing a signal of interest.

Another embodiment of the present invention provides a method for canceling other-system interference in a multicarrier system. The method includes receiving a signal including content from a target system as well as an interfering system, and equalizing the received signal based on a known channel response of the interfering system, thereby providing estimates of data symbols transmitted by the interfering system. The method further includes de-spreading the estimates of the data symbols pursuant to a known spreading code of the interfering system, and determining values for actual data symbols transmitted by the interfering system based on the estimated data symbols, thereby providing a vector of actual data symbol estimates for the interfering system. The method continues with re-spreading the vector of actual data symbol estimates pursuant to the known spreading code of the interfering system, and re-applying the known channel response of the interfering system, thereby providing an estimate of the interfering system signal. The method continues with subtracting the estimate of the interfering system signal from the received signal, thereby providing a signal that is external interference-cancelled.

In one particular embodiment, the equalizing is preceded by converting the received signal to its digital equivalent, removing a cyclic prefix from the received signal, and computing an FFT of the received signal to generate a frequency domain representation of the received signal that can be subjected to the equalization and subsequent processing. In another particular embodiment, the de-spreading is preceded by de-mapping the estimates of the data symbols from their subcarriers, and the re-spreading is followed by re-mapping the actual data symbol estimates to their subcarriers.

In another particular embodiment, the method includes demodulating the signal that is external interference-cancelled using multiuser detection capability, thereby providing a signal of interest. In another such embodiment, the method includes equalizing the signal that is external interference-cancelled based on a known channel response of the target system, thereby providing estimates of data symbols transmitted by the target system. This particular embodiment continues with de-spreading the estimates of data symbols transmitted by the target system pursuant to a known spreading code of the target system, and decoding the estimates of data symbols transmitted by the target system, according to transmitter encoding of the target system, thereby providing a signal of interest.

In another particular embodiment, the method further includes equalizing the signal that is external interference-cancelled based on a known channel response of the target system, thereby providing estimates of data symbols transmitted by the target system. The method here continues with de-spreading the estimates of data symbols transmitted by the target system pursuant to a known spreading code of the target system, and determining values for actual data symbols transmitted by the target system based on the estimated data symbols, thereby providing a vector of actual data symbol estimates for the target system. The method continues with re-spreading the vector of actual data symbol estimates pursuant to the known spreading code of the target system, and re-applying the known channel response of the target system, thereby providing an estimate of the target system signal. The method proceeds with subtracting the estimate of the target system signal from the signal that is external interference-cancelled, thereby providing a signal that is external and internal interference-cancelled.

In this particular embodiment, the method may further include demodulating the signal that is external and internal interference-cancelled using multiuser detection capability, thereby providing a signal of interest. Another variation on this particular embodiment includes equalizing the signal that is external and internal interference-cancelled based on a known channel response of the target system, thereby providing estimates of data symbols transmitted by the target system. This embodiment continues with de-spreading the estimates of data symbols transmitted by the target system pursuant to a known spreading code of the target system, and decoding the estimates of data symbols transmitted by the target system, according to transmitter encoding of the target system, thereby providing a signal of interest. Note that the equalizing, de-spreading, determining, re-spreading, re-applying, and subtracting can be repeated a number of times for at least one of the target system and the interfering system based on a predefined rule of iteration.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention enable other-user interference cancellation in multicarrier communication systems, particularly in receivers that are in the presence of two or more network systems (e.g., MC-CDMA, 802.11 systems, OFDM). For each channel of interest, the interference contributed by other network systems to the received signals is cancelled, and then any same-system contributed interference is cancelled. The process can be done once, or applied iteratively.

By removing the contribution of the interfering systems from the received signal, the portion of the receiver operating on the system of interest is no longer interference limited and the receiver is able to successfully decode the desired user within the system of interest. Therefore, a solution is provided that improves the inadequate performance of receivers that treat multiuser interference as noise, particularly when two or more networks are visible. In addition, multiuser techniques are applied to multicarrier and OFDM signals, thereby benefiting the proliferation of wireless networks. Before describing embodiments of the present invention, some background information on wireless networks and cross-system interference is provided in reference to FIG. 8.

Cross-System Interference in a Wireless Network

Figure 8:
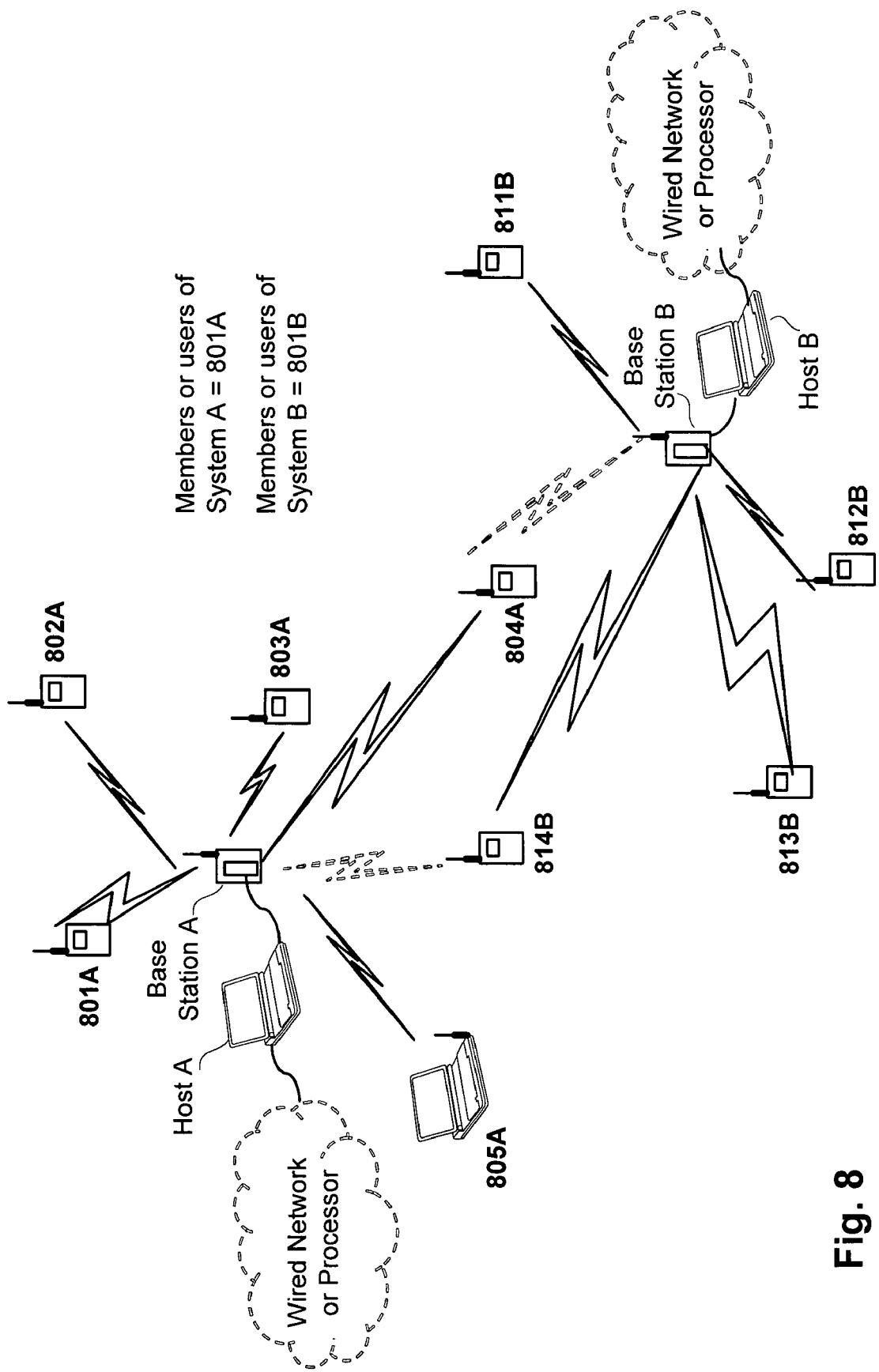
FIG. 8 is an illustration demonstrating an example of interfering wireless networks.

FIG. 8 presents an example of two wireless networks that are interfering with each other. A first system includes a host A that is communicatively coupled to a base station A. This system A includes a number of users, including 801A-805A. A second system includes a host B that is communicatively coupled to a base station B. This system B includes a number of users, including 811B-814B. Each host A and B may further be coupled, for example, to a network or processing environment. Other configurations will be apparent in light of this disclosure.

As can be seen, each base station A and B is transmitting data intended for the members/users of its network. Note that the data sent to any one user (e.g., 801A) of a particular system might be different from the data sent to another user (e.g., 802A) of that same system. In one particular example, base station A could be a wireless hub for home networking of home office network devices, while base station B could be a wireless hub for home networking of personal (non-work related) network devices. Devices that participate in either of the networks could be, for example, desktop and laptop computers, personal digital assistants, wireless digital radios, game consoles, or other such network devices. In another particular example, base station A could be a wireless hub located in a dormitory room for networking of personal networking devices of one student, while base station B could be a wireless hub for networking of personal networking devices of another student. Again, devices that participate in either of the networks could be desktop and laptop computers, personal digital assistants, wireless digital radios, game consoles, or other such network devices.

When two wireless network systems are physically close to one another, the signals from the respective base stations might be received by devices of the other system. Likewise, signals transmitted from any of the networked devices can be received by the base station of the neighboring system. Generally stated, the signals received by elements of one system from other systems causes multiuser interference for the devices in that receiving system, thereby degrading that system's performance. Such interference is referred to herein as cross-system interference.

In the example shown in FIG. 8, network device 804A is in communication with both base stations A and B, just as is network device 814B. Thus, device 804A is either receiving cross-system interference from base station B, contributing cross-system interference to base station B, or both. Likewise, device 814B is either receiving cross-system interference from base station A, contributing cross-system interference to base station A, or both. Note also that same-system interference may also exist. For instance, device 801A may receive not only its intended signals, but also the signals intended for devices 802A-805A.

Multicarrier OFDM and CDMA

OFDM is a digital modulation approach that breaks up a single wideband channel into many narrowband subchannels. Each subchannel transmits a small piece of information on a different subcarrier frequency that together with the other subchannels comprises a larger block of information. The bands about each subcarrier are selected so adjacent bands do not interfere with each other. With the narrow band subchannels defined, transmission data can now be assigned to each subcarrier.

Two ways of assigning a data symbol to the desired subcarrier frequency include multiplying the symbol by the appropriate subcarrier waveform or performing an inverse discrete Fourier transform (IDFT) of the symbol at the desired frequency. The common way to perform this frequency mapping is to exploit high speed integrated circuits specifically designed to perform a fast Fourier transform (FFT). This is accomplished by taking a serial data stream and assigning each symbol to a different bin (also referred to as subcarrier) in the frequency domain. Taking the inverse FFT (IFFT) of these symbols results in the time domain representation of the OFDM signal with each symbol assigned to the appropriate subcarrier.

Two advantages OFDM offers are ease of channel equalization and the ability to allow variable data rates per subchannel or user. Since the transmitted information is broken into several narrowband channels, it ensures flat fading over each subchannel, allowing for equalization with a complex divide at the receiver. Using knowledge of the channel and the type of service being requested, the selection of the waveform at each subchannel can be dynamically adapted to maximize the information carrying capacity of the subchannel.

If no constraints are placed on the selection of the digital waveform used at each subcarrier (i.e. no need to select the same modulation type for each subcarrier), then each subcarrier could dynamically select its modulation type based on the channel state information, the type of service being requested, or some other factor yet to be defined. For example, a system may have one poor subchannel which can only support QPSK modulation while the other subchannels have very little distortion and can support 64-QAM with very low bit error rates. The OFDM architecture supports this ability to dynamically allocate channel resources.

CDMA was designed for the purpose of allowing multiple users to occupy the same frequency channel simultaneously. CDMA assigns individual users a unique spreading code that is orthogonal to all other user's spreading codes. When spread, individual users appear as noise to all other users. By combining OFDM and CDMA, each user's bits are spread in parallel across all subchannels within a particular channel allowing not only multiple users to occupy the same bandwidth, but also to allow all users access to high data rates.

In more detail, MC-CDMA is an extension of OFDM communications, and combines the ease of channel equalization offered by OFDM with the multiple access ability of direct-sequence CDMA (DS-CDMA). MC-CDMA takes a symbol d for a user and applies a unique spreading code c to it, where $c=[c_1 \ldots C_L]^T$ and L is the spreading code length. Each chip of the spread symbol is assigned to a different subcarrier. This process is repeated for all users with each user getting assigned a unique spreading code. Walsh-Hadamard codes are a typical choice for the spreading codes. The collection of user chips assigned to each subcarrier are summed to generate a single symbol for transmission over each subcarrier. The collection of combined chips is then transmitted using the OFDM modulation process.

By replacing each spreading code with a code that assigns each user to a unique set of subcarriers, the MC-CDMA system can be treated as a basic OFDM system. In this sense, an OFDM signal is a specific case of the MC-CDMA system. The received MC-CDMA signal has a similar form as the OFDM signal. In fact, if desired or necessary, the spreading coefficients $c_k$, for k=1, 2 . . . K, can be chosen so that an MC-CDMA signal is exactly equal to an OFDM signal. The only difference is that the general form of an MC-CDMA transmitted signal contains data symbols that have been spread by a set of orthogonal spreading codes, as represented mathematically by equation 1:

$$r = Hs + n = H\sum_{k=1}^{K} c_k d_k + n.$$ (Equation 1)

The MC-CDMA demodulation process begins with an OFDM process by removing the cyclic prefix, computing the FFT to generate the frequency domain representation of the received signal (r), and performing channel equalization. The resulting signal is correlated to each of the K spreading codes and mapped to the closest constellation point to generate an estimate of each transmitted symbol. Channel equalization is done to account for the effects of the channel on the transmitted signal. Interference cancellation is designed to further remove the interference effects that multiple users within the system.

Interference Cancellation Architecture

The basic idea of interference cancellation begins by performing a conventional single user detection to generate an initial estimate of each user's transmitted symbols. In one embodiment of the present invention, these estimates are then stripped from the composite received signal for all users except for the user of interest. A single user detector is used on the interference removed signal to generate the final estimate of the transmitted signals.

Figure 1:
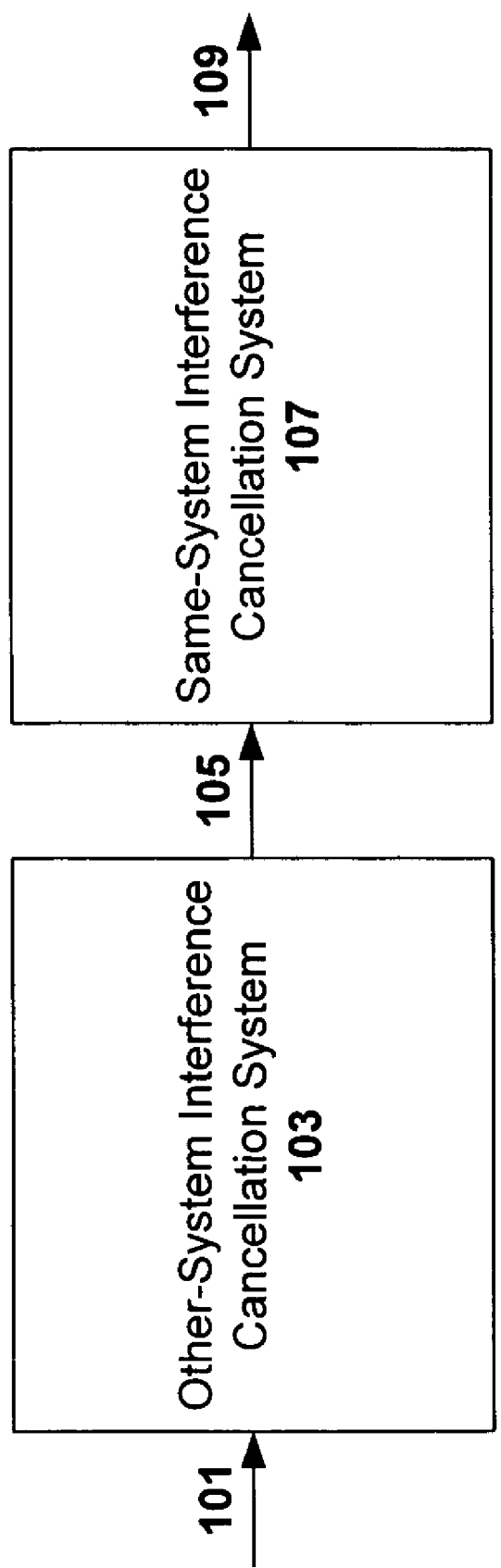
FIG. 1 is a high level block diagram illustrating a wireless receiver configured to perform both cross-system and same-system interference cancellation in accordance with one embodiment of the present invention.

FIG. 1 is a high level block diagram illustrating a wireless MC-CDMA receiver configured with cross-system interference cancellation in accordance with one embodiment of the present invention. As can be seen, the receiver includes an other-system interference cancellation system 103 and a same-system interference cancellation system 107. Thus, the receiver is adapted to compensate for both cross-system interference from non-target systems, as well as other-user interference of the target system.

The received signal 101 has signal content from the target system as well as from one or more interfering systems. System 103 operates to remove interference from the non-target system(s) and outputs an interference-cancelled signal on line 105. More detailed embodiments of system 103 will be discussed in reference to FIGS. 2, 5, and 6. System 107 removes the same-system interference, and outputs the data estimates for the desired user on line 109. More detailed embodiments of system 107 will be discussed in reference to FIGS. 3, 5, and 6.

Cross-System Interference Cancellation

Figure 2:
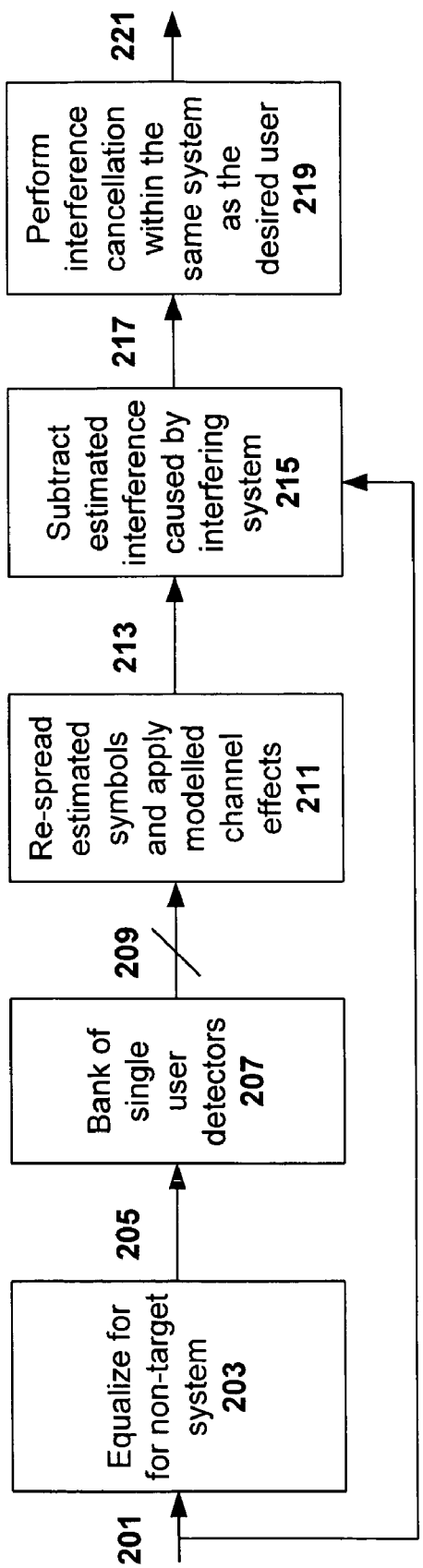
FIG. 2 is a block diagram illustrating a cross-system interference cancellation system in accordance with one embodiment of the present invention.

FIG. 2 is a block diagram illustrating a cross-system interference cancellation system in accordance with one embodiment of the present invention. The system includes an equalizer module 203, a band of single-user detectors 207, a re-spreading module 211, and a subtractor module 215. The output of this system can be provided to a same-system interference cancellation system 219 as described in reference to FIG. 3, and/or to a conventional MUD module adapted to extract the target user signal. Thus, the system of FIG. 2 operates to cancel interference attributed to network systems other than the target network system which includes the signal/user of interest.

In cross-system cancellation, each system is treated as an individual entity with an associated power level. The system with the highest power level that is not the system of interest will have all of its users cancelled. This process proceeds until the system of interest is reached. This approach follows successive interference cancellation (SIC) on a system basis.

The signal is received on line 201 and is equalized in equalizer module 203. The equalized signal is passed on line 205. The bank of single-user detectors 207 operates to de-spread the signal for all of the users in a single interfering system, and outputs a set of symbol estimates for the non-target-system users on line 209. The symbol estimates may either be hard-valued or soft-valued. Note that within the single user detectors, a symbol decision process can be implemented to determine values for actual data symbols transmitted by the interfering system based on the set of symbol estimates for the non-target-system users on line 209. Also note that the notation (/) in FIG. 2 indicates that a plurality of symbol estimates (one for each user within the non-target system) are passed from the bank of single user detectors 207 to the re-spreading module 211.

The re-spreading module 211 then re-spreads the symbol estimates according to a known spreading technique used at the original transmitters, modifies the symbol estimates according to the modeled channel effects, and provides the results on line 213. The results are the estimated interferences caused by the interfering systems. The subtractor module 215 subtracts the estimated interference on line 213 from the originally received signal on line 201, and provides the result on line 217.

A same-system interference cancellation system 219 receives the resulting signal on 217, and removes the same-system interference caused by users within the target system unit. The external/internal interference-cancelled signal is provided at line 221. Alternatively, system 219 can be a conventional multiuser detector (MUD) module such as an optimal MUD detector, decorrelator, or minimum mean-square error (MMSE) detector, adapted to detect the signal/user of interest. As another alternative, system 219 can be a conventional single user detector module such as a matched filter or RAKE receiver, adapted to detect the signal/user of interest. In that case, no internal interference cancellation is performed, and the external interference-cancelled signal is provided at line 221.

Same-System Interference Cancellation

Figure 3:
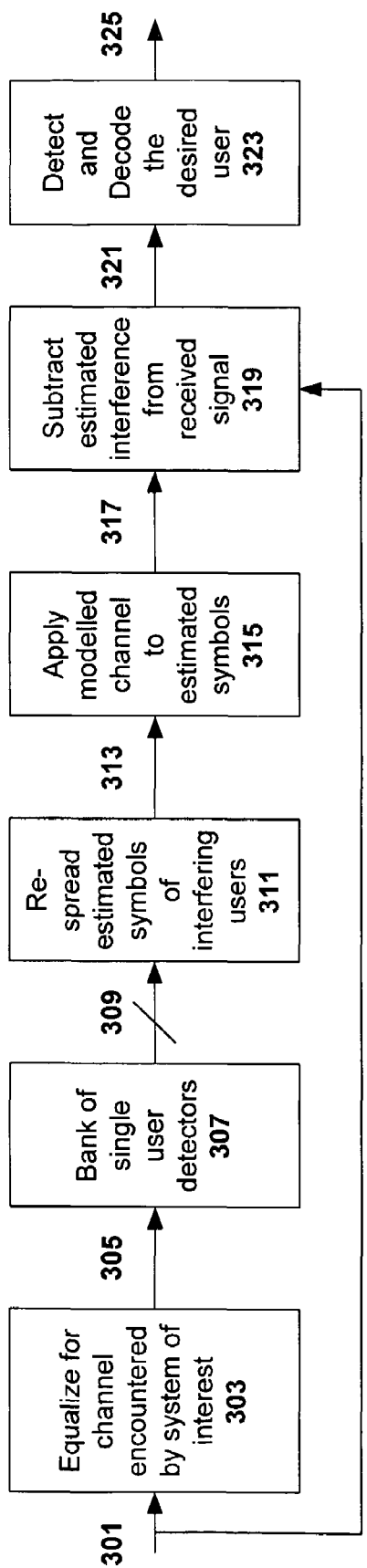
FIG. 3 is a block diagram illustrating a same-system interference cancellation system in accordance with one embodiment of the present invention.

FIG. 3 is a detailed block diagram illustrating a same-system interference cancellation system in accordance with one embodiment of the present invention. The system includes an equalizer module 303, a bank of detectors 307, a re-spreading module 311, an application module 315, a subtractor module 319, and a detect/decode module 323. It will be understood that this system operates only on the network system containing the user of interest. Thus, it operates to cancel interference attributed to other users that are members of the same network system.

Any potential signals from other network systems are assumed cancelled by operation of cross-system interference cancellation as discussed herein. The signal is received on line 301 and is equalized by the equalizer module 303. The equalizer 303 is based on the channel that is expected for the system of interest. A bank of single-user detectors 307 (such as conventional OFDM detectors) for all users but the user of interest operate on the equalized signal on line 305, and outputs a set of symbol estimates for the interfering users on line 309. In this sense, the bank of detectors operate as a de-spreading module to provide the symbol estimates of the interfering users. The symbol estimates may either be hard-valued or soft-valued.

The symbol estimates are then re-spread by the re-spreading module 311 according to the spreading technique used at the original transmitter, and the resulting signals are provided on line 313. The modeled channel effects are then applied to the estimated symbols by module 315, with the resulting estimate of the composite interfering signal provided on line 317.

The subtractor module 319 subtracts the estimated interference on line 317 from the originally received signal line 301, and places the result (the interference-cancelled signal) on line 321. The interference-cancelled signal is provided to the conventional detector/decode module 323, which determines the data bit estimates for the desired user, and provides those data bit estimates at line 325.

Note that each of the interference cancellation systems illustrated in FIGS. 2 and 3 can be implemented, for example, as software instructions executing on one or more digital signal processors or other suitable processing environment. Alternatively, each system can be implemented in purpose built silicon (e.g., ASIC or FPGA). Further note that these particular configurations were selected to demonstrate functionality of the same-system and cross-system interference cancellation systems, and that the modules of each system can be integrated with one another to form one or more discrete modules or processes. Likewise, the interference cancellation systems themselves can be integrated with one another. Similar interference cancellation systems operating on additional non-target systems in the manner illustrated by FIGS. 2 and 3 can also be implemented according to the present invention.

Figure 4:
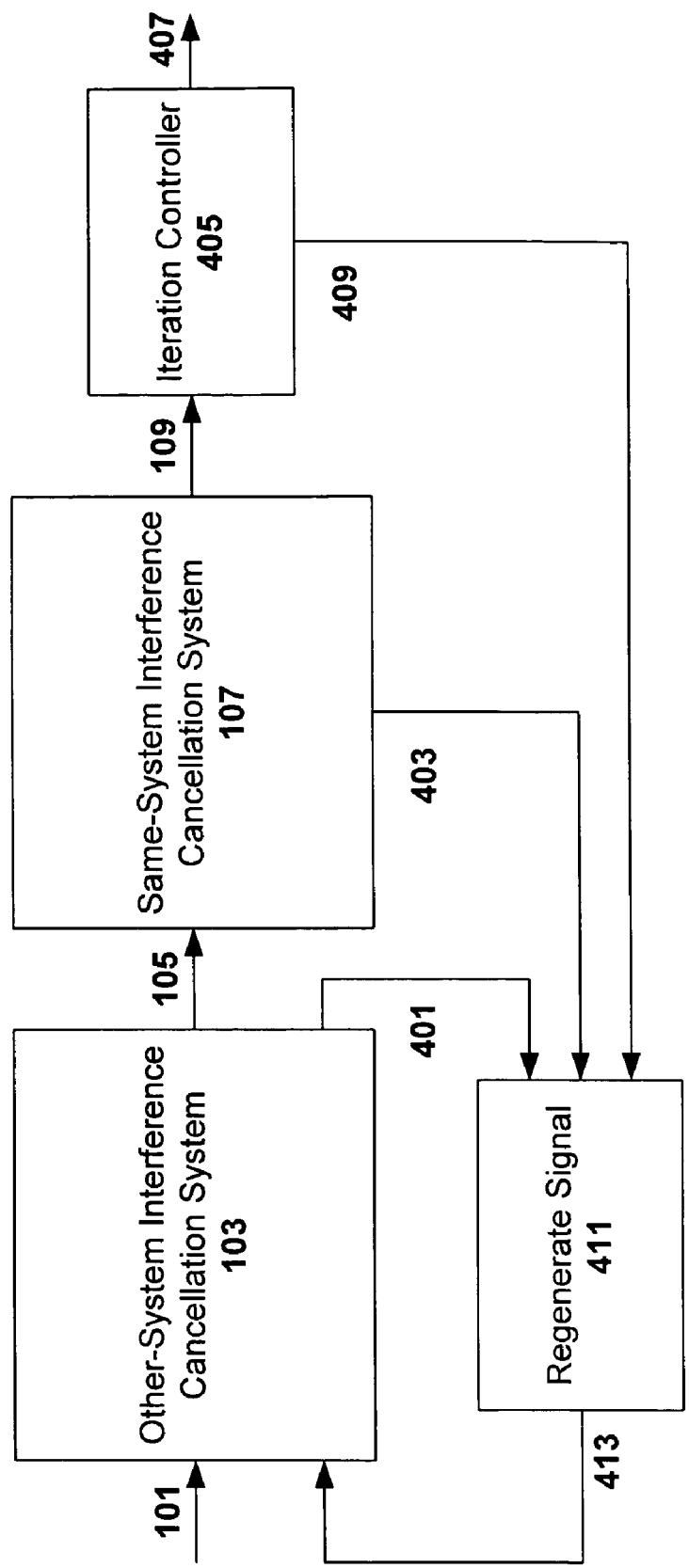
FIG. 4 is a block diagram illustrating an iterative interference cancellation system in accordance with another embodiment of the present invention.

FIG. 4 is a detailed block diagram illustrating an iterative interference cancellation system in accordance with another embodiment of the present invention. The system includes an iteration controller module 405 and a regenerate signal module 411, operatively coupled with an other-system interference cancellation system 103 and a same-system interference cancellation system 107. Embodiments of the interference cancellation systems 103 and 107 were previously discussed in reference to FIGS. 2 and 3, respectively.

The received signal 101 has signal content from the target system as well as one or more interfering systems. Other-system interference cancellation system 103 removes interference from the non-target system(s) and outputs the external interference-cancelled signal on line 105. Same-system interference cancellation system 107 removes the interference from the target system, and the resulting data estimates for the desired user are output on line 109. This output is external and internal interference-cancelled. The iteration controller module 405 receives the data estimates and either outputs them on line 407, or returns them for more processing on line 409.

In one embodiment, the rule used by the iteration controller 405 is performance based, such as a rule based on soft-valued confidence levels produced in the decoding process performed by system 107. Alternatively, the rule used by the iteration controller 405 can be based on environmental factors, such as the received signal-level or signal-to-noise ratio. Alternatively, the rule used by the iteration controller 405 can be based on a pre-determined number of desired number of iterations for a particular application or environment. Other predefined rules of iteration can be used here also as will be apparent in light of this disclosure.

If it has been determined that another iteration of processing will occur, the regenerate signal module 411 reconstitutes (e.g., re-spreads and re-maps) the signal using signal information about the other systems provided by the other-system interference cancellation system 103 on line 401, same-system user information provided by the other-system interference cancellation system 107 on line 403, and the data estimates for the user of interest provided by the iteration controller 405 on line 409. The reconstituted signal is then provided on line 413 back to the other-system interference cancellation system 103, and the process is repeated with line 413 as the input in place of the previously used line 101.

Note that the regenerate signal module 411 is shown external to the interference cancellation systems 103 and 107. As will be apparent in light of the disclosure, the functionality of the regenerate signal module 411 can be integrated into each of these interference cancellation systems. For example, each interference cancellation system can be configured with a re-spreading, re-mapping, and re-applying modules as described in reference to FIGS. 5 and 6.

Thus, embodiments of the present invention enable the correct detection and demodulation of signals of the target system, even when the target system is subjected to cross-system interference. The techniques provide reduced complexity with comparable performance when compared to full complexity MUD applied to the original aggregate signal with components from the target and non-target (interfering) systems. An iterative process through either or both of the cross-system and same-system interference cancellation sections can be employed to further improve performance. Note, however, that such iteration is not necessary.

In addition, with sufficiently low-complexity, a system configured in accordance with the principles of the present invention can be implemented in real-time. The improved performance and low complexity enables wireless networks to allow more active transmitters (e.g., paying customers/subscribers, users, phones, computers) without requiring more bandwidth or compromising performance. Additionally, a system configured in accordance with the principles of the present invention can also facilitate the implementation of multiple co-located wireless networks in a densely populated area without pre-installation knowledge of any existing systems or coordination between networks. Note that the disclosed techniques may be used to replace existing receivers without any modification to the corresponding transmitters, thereby allowing service providers to offer improved performance without changing established signaling methods.

MC-CDMA Receiver with Cross-System Interference Cancellation

As previously explained, when multiple systems interfere with one another, errors are introduced from several different sources including overlap (i.e., non-orthogonality) of spreading codes, correlation of channel characteristics, and correlation of data characteristics. Thus, the receiver must be configured with cross-system interference cancellation ability in accordance with the principles of the present invention.

In one particular embodiment, an MC-CDMA receiver configured with cross-system interference cancellation as described herein is able to detect and demodulate signals in a Rayleigh fading environment with a loading of two. In addition to cross-system interference cancellation, same-system interference cancellation can be provided. Thus, robust multiuser detection is enabled through the use of interference cancellation that allows an improvement in received signal quality, while the information capacity of the channel is maintained. Additionally, the number of simultaneous systems in operation in a given area can be increased without sacrificing quality of service.

Figure 5:
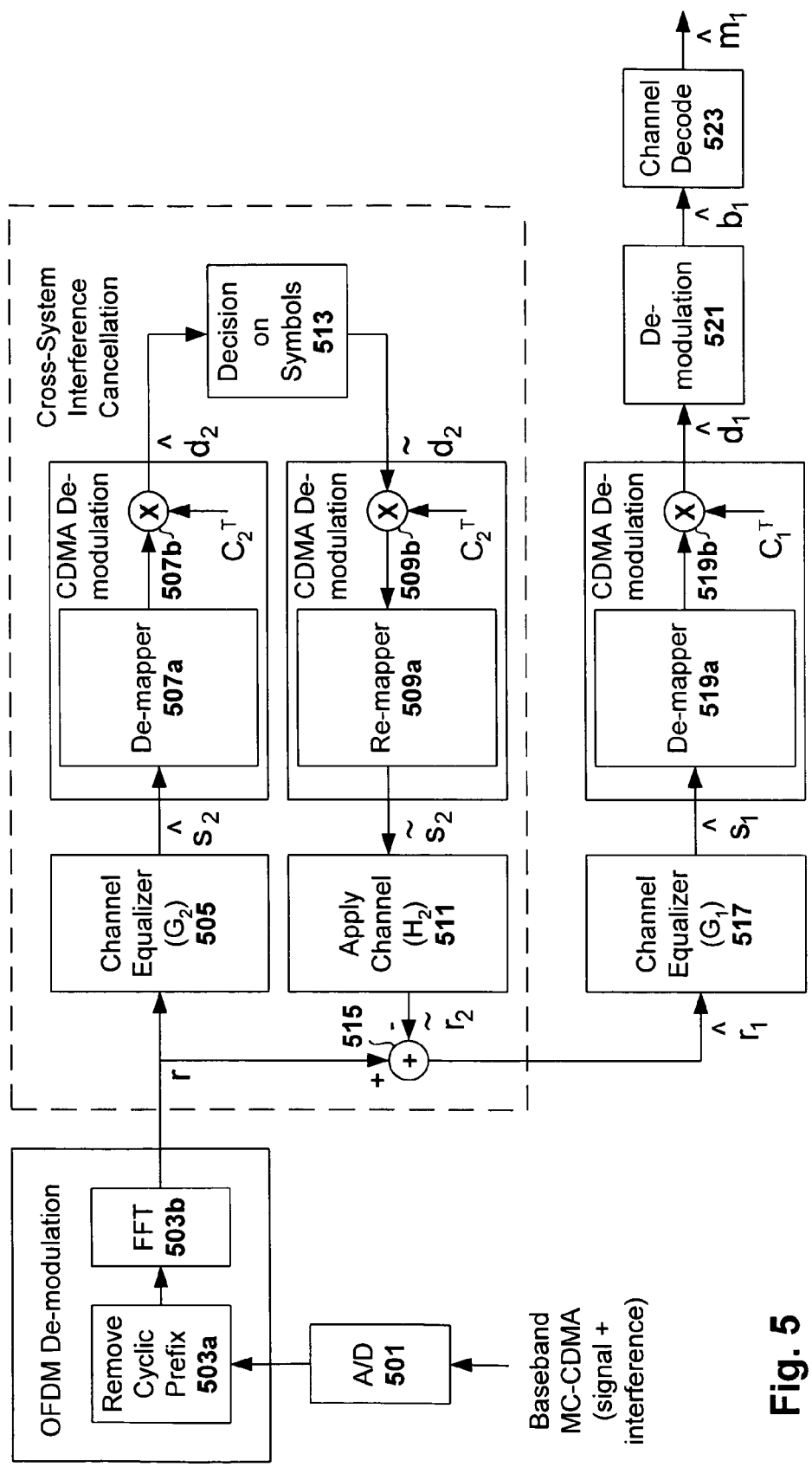
FIG. 5 is a detailed block diagram illustrating an MC-CDMA receiver configured with cross-system interference cancellation in accordance with one embodiment of the present invention.

FIG. 5 is a detailed block diagram illustrating an MC-CDMA receiver configured with cross-system cancellation for two distinct systems in accordance with one embodiment of the present invention. The receiver includes an analog front end, an OFDM demodulation section, a cross-system cancellation section which performs CDMA demodulation on non-target or interfering systems, a CDMA demodulation section for the target system, and a demodulate/decode section.

The analog front end includes an A/D converter 501. The OFDM demodulation section includes a cyclic prefix removal module 503a and an FFT module 503b. The cross-system cancellation section includes a channel equalizer module 505, a de-mapper module 507a, de-spreader module 507b, a symbol decision module 513, a re-spreader module 509b, a re-mapper 509a, an apply channel module 511, and a subtractor module 515. The CDMA demodulation section for the target system includes a channel equalizer module 517, a de-mapper module 519a, and de-spreader module 519b. The demodulate/decode section includes a demodulation module 521 and a channel decode module 523.

In this example, each received system is assumed to have K total users and the same spreading codes. Note, however, that each received system can have a different spreading code, provided the different codes are known or can be estimated. Likewise, each system may have a different number of users, provided that number is known or can be estimated. In addition, while this example considers two distinct networks, the technique is not limited to operation with only two systems. For purposes of clarity, note that first subscripts denote which system is being analyzed, while second subscripts denote the user within the system. Second subscripts are not used when the equation refers to purely system level functionality. System 1 (designated with subscript 1) is assumed to be the MC-CDMA system of interest, while system 2 (designated with subscript 2) is an interfering MC-CDMA system.

The incoming baseband MC-CDMA signal, which includes signal plus internal and/or external interference, is received by the analog front end. Here, the A/D converter 501 converts the received signal to its digital equivalent. Other front end componentry and processing may also be implemented here, such as an antenna or antenna array, filtering and frequency conversion to facilitate subsequent processing. The MC-CDMA demodulation process begins with an OFDM process of removing the cyclic prefix with 503b, and computing the FFT with 503b to generate the frequency domain representation of the received signal (r).

The received vector for a two system model is given as $$r = r_1 + r_2 + n$$

$$r = H_1 s_1 + H_2 s_2 + n$$

$$r = H_1 C_1^T d_1 + H_2 C_2^T d_2 + n \quad \text{(Equation 2)}$$

where $r_1$ and $r_2$ are the received vectors from systems 1 and 2, respectively. In addition, $H_1$ and $H_2$ are the respective channel responses for each system, $d_1$ and $d_2$ are the transmitted data symbols for each system, $C_1$ and $C_2$ are the matrices of spreading codes used by each system, n is a vector of AWGN due to the receiver, and $(\ )^T$ denotes the transpose of the vector.

In order to cancel the interference of system 2, an estimate is made of the symbols in that system. First, the received vector can be equalized by the channel response of system 2 as follows:

$$\hat{s}_2 = G_2 r$$

$$\hat{s}_2 = G_2 (H_1 s_1 + H_2 s_2 + n)$$

$$\hat{s}_2 = G_2 H_1 C_1^T d_1 + G_2 H_2 C_2^T d_2 + G_2 n \quad \text{(Equation 3)}$$

where $G_2$ is the diagonal matrix channel equalizer for system 2. In one particular embodiment, the channel equalizer 505 is an MMSE equalizer, taking into account both the channel response and the added noise. The estimates of the data symbols per subcarrier are then de-mapped from their subcarriers by module 507a, and de-spread by module 507b pursuant to the spreading code matrix of system 2, $C_2$, as shown below:

$$\hat{d}_2 = C_2 \hat{s}_2$$

$$\hat{d}_2 = C_2 G_2 H_1 C_1^T d_1 + C_2 G_2 H_2 C_2^T d_2 + C_2 G_2 n \quad \text{(Equation 4)}$$

Using this vector of estimated data symbols, a decision is made by module 513 on the value of the actual data symbols. This new value, denoted $\tilde{d}_2$, is a function of the transmitted data symbols plus an introduced error based on the decision. This new vector can then be re-spread by module 509b as shown in Equation 5, and re-mapped to their subcarriers by module 509a.

$$\tilde{s}_2 = C_2^T \tilde{d}_2 \quad \text{(Equation 5)}$$

The channel response can be re-applied by module 511 as follows:

$$\tilde{r}_2 = H_2 \tilde{s}_2$$

$$\tilde{r}_2 = H_2 C_2^T \tilde{d}_2 \quad \text{(Equation 6)}$$

such that $\tilde{r}_2$ is an estimate of the received signal from system 2.

The system 2 estimate can then be subtracted from the original received vector by module 515, as follows:

$$\hat{r} = r - \tilde{r}_2$$

$$\hat{r}_1 = r_1 + r_2 - \tilde{r}_2 + n$$

$$\hat{r}_1 = H_1 C_1^T d_1 + H_2 C_2^T d_2 - H_2 C_2^T \tilde{d}_2 + n$$

$$\hat{r}_1 = H_1 C_1^T d_1 + H_2 C_2^T (d_2 - \tilde{d}_2) + n \quad \text{(Equation 7)}$$

where r is the aggregate received vector, $r_1$ and $r_2$ are the received vectors from systems 1 and 2, respectively, $\tilde{r}_2$ is the estimate of contribution of system 2 to the aggregate received vector, $H_1$ and $H_2$ are the respective channel responses for each system, $d_1$ and $d_2$ are the transmitted data symbols for each system, $\tilde{d}_2$ is the estimate of the transmitted data symbols for system 2, $C_1$ and $C_2$ are the matrices of spreading codes used by each system, n is a vector of AWGN due to the receiver, and $(\ )^T$ denotes the transpose of the vector.

Estimates of system 1 user data symbols are created in a similar fashion to Equations 3 and 4. An equalizer module 517 created from the channel response of system 1 can be applied to this new estimated received vector for system 1 as follows:

$$\hat{s}_1 = G_1 \hat{r}_1$$

$$\hat{s}_1 = G_1 (H_1 C_1^T d_1 + H_2 C_2^T (d_2 - \tilde{d}_2) + n)$$

$$\hat{s}_1 = G_1 H_1 C_1^T d_1 + G_1 H_2 C_2^T (d_2 - \tilde{d}_2) + G_1 n \quad \text{(Equation 8)}$$

where $G_1$ is the diagonal matrix equalizer for system 1.

The estimates of the spread symbols per subcarrier for system 1 are then de-mapped from their subcarriers by module 519a, and de-spread by module 519b pursuant to the spreading code matrix of system 1, $C_1$, as shown below:

$$\hat{d}_1 = C_1 \hat{s}_1$$

$$\hat{d}_1 = C_1 G_1 H_1 C_1^T d + C_1 G_1 H_2 C_2^T (d_2 - \tilde{d}_2) + C_1 G_1 n \quad \text{(Equation 9)}$$

This estimate of all users' data symbols within system 1 can then be demodulated and decoded, by modules 521 and 523, respectively, according to the modulation and encoding technique used at the transmitter (e.g., QSPK, QAM).

MC-CDMA Receiver with Dual Mode Interference Cancellation

As will be understood in light of this disclosure, dual mode interference cancellation involves removing all interfering system contributions to the aggregate received signal, and then removing same-system interference within a system of interest. In this embodiment, same-system or "internal" interference refers to multiuser interference generated within a single MC-CDMA system between individual users, while cross-system or "external" interference refers to interference generated caused by different overlapping MC-CDMA systems that are operating in the same frequency band but are not the system of interest. By removing all interfering systems' contributions (i.e., external interference) to the received signal, the wireless receiver is no longer interference limited. Thus, the receiver is able to successfully detect and demodulate the desired user within the system of interest.

Figure 6:
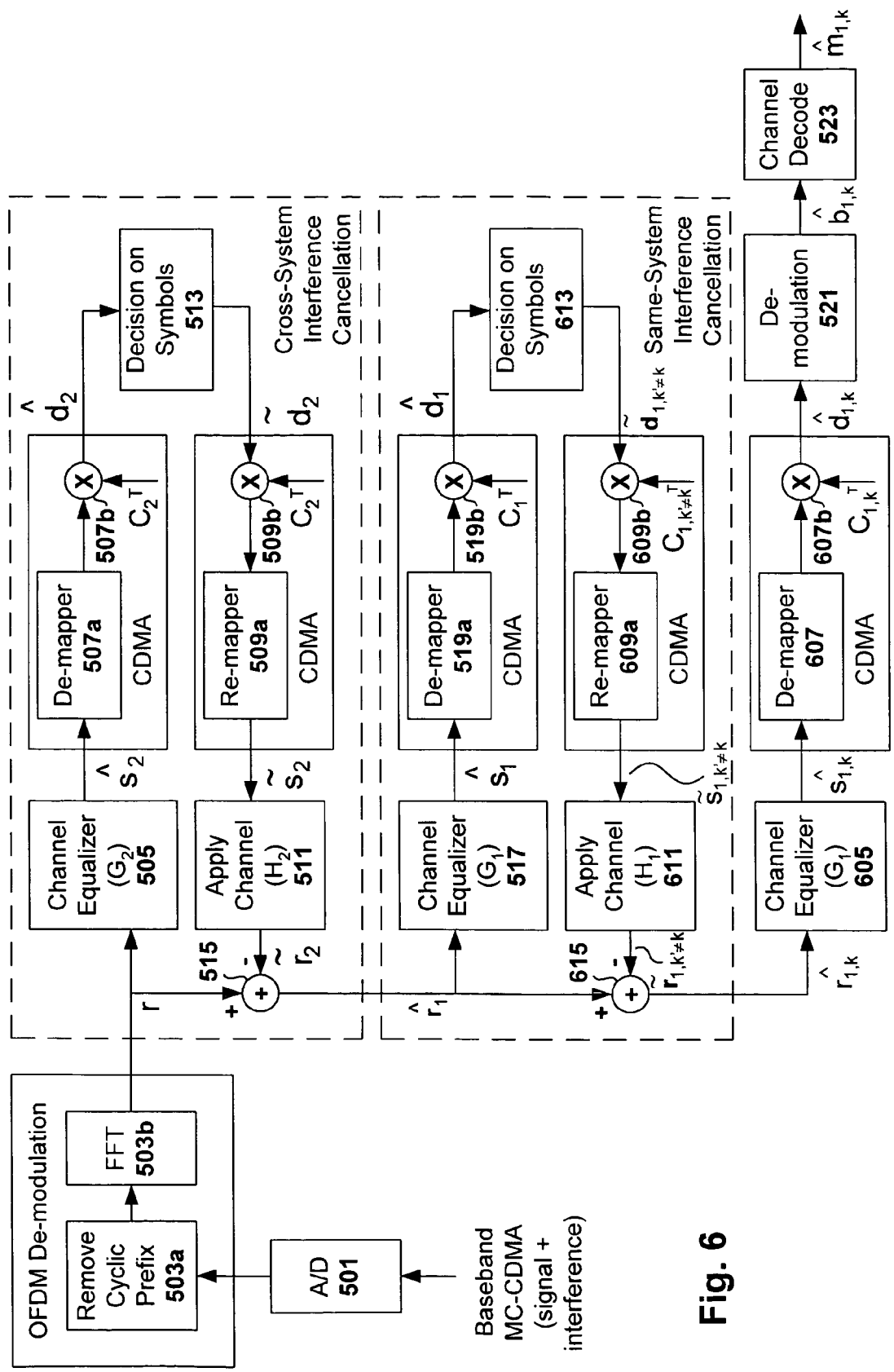
FIG. 6 is a detailed block diagram illustrating an MC-CDMA receiver configured with both cross-system and same-system interference cancellation in accordance with another embodiment of the present invention.

FIG. 6 is a detailed block diagram illustrating an MC-CDMA receiver configured with both cross-system and same-system interference cancellation for two (or more) systems in accordance with another embodiment of the present invention. In this application, the system of FIG. 5 is extended to further increase receiver performance. In addition to canceling all interfering systems of higher power, interference can also be cancelled within the system of interest. This approach follows parallel interference cancellation (PIC) within a system.

In this example, each distinct MC-CDMA system is assumed to have K total users and the same spreading codes. Recall, however, that each received system can have a different spreading code and/or a different number of users, provided the different codes and number of users are known or can be estimated. As previously stated in reference to FIG. 5, system 1 is assumed to be the system of interest while system 2 is an interfering system. For purposes of discussion, assume there is a single user of interest, k, within system 1. In addition, note that the discussion in reference to FIG. 5 equally applies to the discussion in reference to FIG. 6 as will be appreciated.

The same-system interference cancellation section includes a channel equalizer module 517, a de-mapper module 519a, de-spreader module 519b, a symbol decision module 613, a re-spreader module 609b, a re-mapper 609a, an apply channel module 611, and a subtractor module 615. In this particular embodiment, note that the channel equalizer module 517, the de-mapper module 519a, and the de-spreader module 519b are configured and function the same as discussed in reference to FIG. 5. Thus, the vector of estimated data symbols for system 1 ($\hat{d}_1$) is provided by de-spreader module 519b (represented by Equation 9).

Using this vector of estimated data symbols for system 1, a decision is made by module 613 on the value of the actual data symbols for all users but the user of interest (k'≠k). This new value, denoted $\tilde{d}_{1,k'\neq k}$ is a function of the transmitted data symbols plus an introduced error based on the decision. This new vector is then re-spread by module 609b in accordance with a subset of the spreading codes corresponding to users k'≠k as shown in Equation 10, and re-mapped to their subcarriers by module 609a:

$$\tilde{s}_{1,k'\neq k}=C_{1,k'\neq k}{}^T\tilde{d}_{1,k'\neq k} \quad \text{(Equation 10)}$$

The channel response can then be re-applied by module 611 as follows:

$$\tilde{r}_{1,k'\neq k}=H_1\tilde{s}_{1,k'\neq k}$$

$$\tilde{r}_{1,k'\neq k}=H_1C_{1,k'\neq k}{}^T\tilde{d}_{1,k'\neq k} \quad \text{(Equation 11)}$$

such that $\tilde{r}_{1,k'\neq k}$ is an estimate of the received signal from system 1 for all users but the user of interest. The estimate can then be subtracted from the original received vector by the subtraction module 615, as follows:

$$\hat{r}_{1,k}=r_1-\tilde{r}_{1,k'\neq k}+r_2-\tilde{r}_2+n$$

$$\hat{r}_{1,k}=H_1C_1{}^Td_1-H_1C_{1,k'\neq k}{}^T\tilde{d}_{1,k'\neq k}+H_2C_2{}^Td_2-H_2C_2{}^T\tilde{d}_2+n$$

$$\hat{r}_{1,k}=H_1(C_1{}^Td_1-C_{1,k'\neq k}\tilde{d}_{1,k'\neq k})+H_2C_2{}^T(d_2-\tilde{d}_2)+n \quad \text{(Equation 12)}$$

The channel can then be re-equalized by module 605 such that:

$$\hat{s}_{1,k}=G_1H_1(C_1{}^Td_1-C_{1,k'\neq k}\tilde{d}_{1,k'\neq k})+G_1H_2C_2(d_2-\tilde{d}_2)+G_1n \quad \text{(Equation 13)}$$

Modules 607a and 607b operate to provide an estimate of the data symbol for user k, which can be written as:

$$\hat{d}_{1,k}=C_1G_1H_1(C_1{}^Td_1-C_{1,k'\neq k}{}^T\tilde{d}_{1,k'\neq k})+C_1G_1H_2C_2{}^T(d_2-\tilde{d}_2)+C_1G_1n \quad \text{(Equation 14)}$$

By substituting the formula for the transmitted spread symbols from system 1, as shown here, $$s_1=C_1{}^Td_1=c_{1,k}{}^Td_{1,k}+C_{1,k'\neq k}{}^Td_{1,k'\neq k} \quad \text{(Equation 15)}$$

into Equation 14, and re-arranging terms, a formula for the data symbol for user k is described with each error term separated:

$$\hat{d}_{1,k}=C_1G_1H_1c_{1,k}{}^Td_{1,k}+C_1G_1H_1C_{1,k'\neq k}{}^T(d_{1,k'\neq k}-\tilde{d}_{1,k'\neq k})+C_1G_1H_2C_2(d_2-\tilde{d}_2)+C_1G_1n \quad \text{(Equation 15)}$$

The first term in Equation 15 is the data symbol of user k that is of interest, while the three other terms represent errors introduced by the internal cancellation, the cross-system cancellation, and the receiver noise, respectively.

Ideally, the coefficient in the data symbol (first term), $C_1G_1H_1c_{1,k}{}^T$, is equal to one, as will the coefficient in front of the first error term, $C_1G_1H_1C_{1,k'\neq k}{}^T$. When the estimate of the data symbols for users k'≠k is correct or close to correct, the first error term is minimal. The third error term is minimal with a high fidelity receiver that has a low noise floor, such that the second error term will dominate the bit error rate at the receiver. Since there is a mismatch between the spreading codes of system 1 and 2, as well as a mismatch between the channel responses of systems 1 and 2, this error term will cause an irreducible error asymptote at the receiver.

Implementation Details

A simulation was conducted including two identical MC-CDMA systems, both equidistant from a single user receiver belonging to one of the systems. One system transmitter was assumed to be 10 dB louder than the other system transmitter, with the receiver attempting to communicate with the quieter system. The receiver was modeled such that the signals were received from each transmitter frame and bit synchronously, without loss of generality to the asynchronous case.

The channel response between each transmitter and the receiver was modeled as Rayleigh fading with flat fading across individual sub-channels in the system. Both systems were fully loaded with 64 users per system, with each system having 64 subchannels or subcarriers, and each subchannel having a 1 kHz bandwidth. The modulation scheme used on both systems was BPSK with no error-correction coding applied. Knowledge of the spreading codes used by each transmitter was assumed since they are identical transmitters, and perfect estimates of the channel response at the receiver are also assumed.

Performance is measured using bit error rate as a function of signal to noise ratio at the receiver relative to the energy per uncoded bit on the system of interest. Performance is shown in FIG. 7 for three receiver configurations, for each signal to noise ratio, with approximately $7.5*10^4$ uncoded bits transmitted in frames of 256 bits.

The first receiver configuration demonstrated is a conventional MC-CDMA receiver without any type of interference cancellation (No IC), and the graph shows that a conventional MC-CDMA receiver is unable to communicate in this type of overloaded environment. The second receiver configuration demonstrated is a MC-CDMA receiver configured with only cross-system interference cancellation in accordance with the principles of the present invention. This receiver configuration is able to detect and demodulate the user of interest with a bit error rate of $3*10^{-3}$ on an uncoded system at a received SNR of 20 dB.

The third receiver configuration demonstrated is a MC-CDMA receiver configured with both cross-system and same-system interference cancellation in accordance with the principles of the present invention. This receiver configuration is able to detect and demodulate the user of interest with a bit error rate of $3*10^{-3}$ on an uncoded system at a received SNR of 16 dB.

Figure 7:
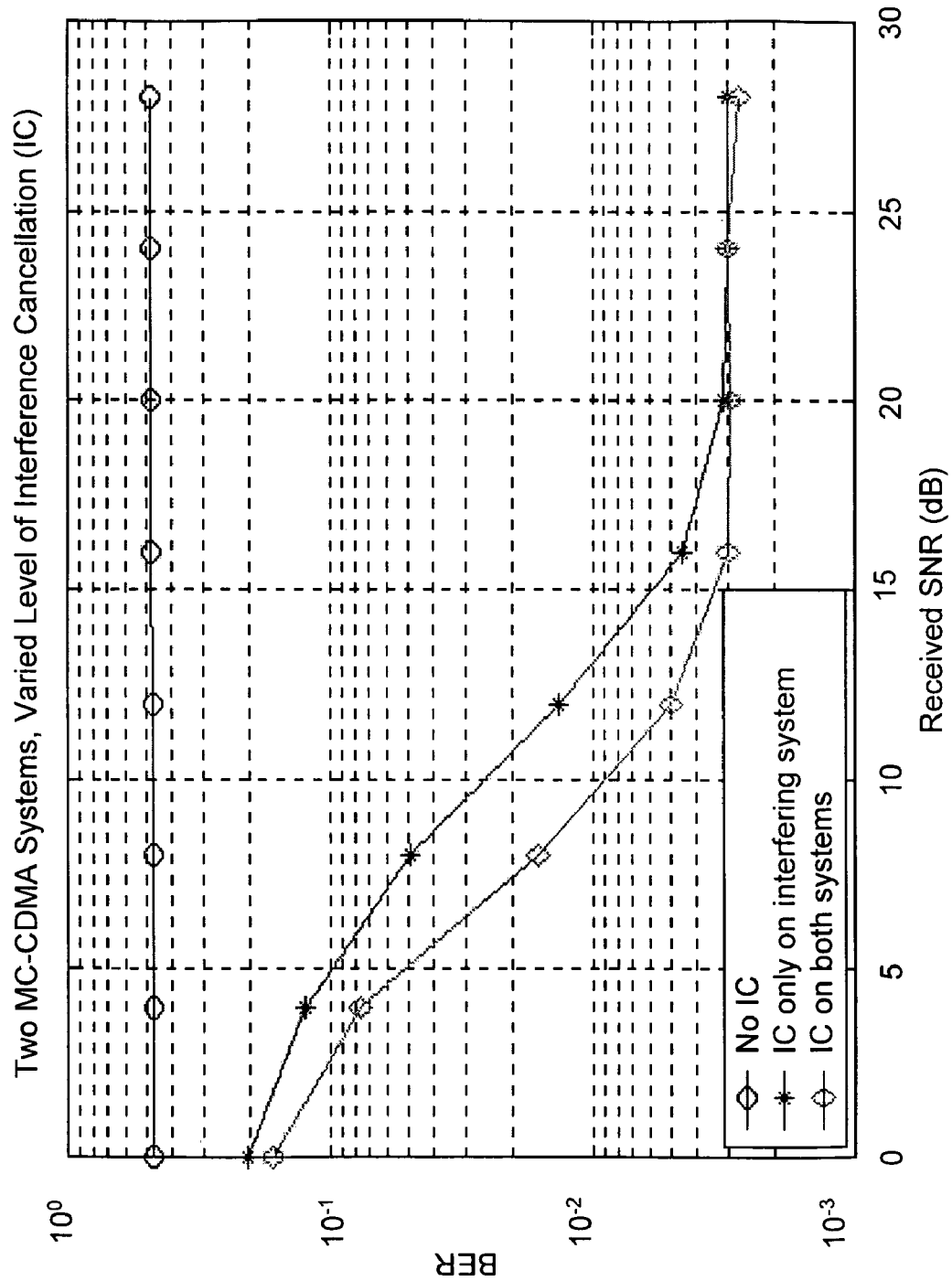
FIG. 7 is a graph illustrating performance of a conventional MC-CDMA system, and two MC-CDMA systems configured in accordance with embodiments of the present invention.

The third error term in Equation 16 is responsible for the asymptote in FIG. 7, and represents an irreducible error created by the process of cross-system interference cancellation. Although this solution is not optimum in the maximum likelihood sense, cross-system interference cancellation allows for an MC-CDMA system to operate in an overloaded environment at reasonable bit error rates and with less complexity than a full maximum likelihood solution. The bit error rates can be further compensated for with the addition of error correction coding, bringing the bit error rate to a level where voice and data signal detection and demodulation is feasible.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for canceling other-system interference in a multicarrier system, the method comprising:
   receiving a signal including content from a target system as well as an interfering system;
   equalizing the received signal based on a known channel response of the interfering system, thereby providing estimates of data symbols transmitted by the interfering system;
   de-spreading the estimates of the data symbols pursuant to a known spreading code of the interfering system;
   determining values for actual data symbols transmitted by the interfering system based on the estimated data symbols, thereby providing a vector of actual data symbol estimates for the interfering system;
   re-spreading the vector of actual data symbol estimates pursuant to the known spreading code of the interfering system;
   re-applying the known channel response of the interfering system, thereby providing an estimate of the interfering system signal;
   subtracting the estimate of the interfering system signal from the received signal, thereby providing a signal that is external interference-cancelled;
   equalizing the signal that is external interference-cancelled based on a known channel response of the target system, thereby providing estimates of data symbols transmitted by the target system;
   de-spreading the estimates of data symbols transmitted by the target system pursuant to a known spreading code of the target system;
   determining values for actual data symbols transmitted by the target system based on the estimated data symbols, thereby providing a vector of actual data symbol estimates for the target system;
   re-spreading the vector of actual data symbol estimates pursuant to the known spreading code of the target system;
   re-applying the known channel response of the target system, thereby providing an estimate of the target system signal; and
   subtracting the estimate of the target system signal from the signal that is external interference-cancelled, thereby providing a signal that is external and internal interference-cancelled.

2. The method of claim 1 wherein the equalizing is preceded by:
   converting the received signal to its digital equivalent;
   removing a cyclic prefix from the received signal; and
   computing an FFT of the received signal to generate a frequency domain representation of the received signal that can be subjected to the equalization and subsequent processing.

3. The method of claim 1 further comprising:
   demodulating the signal that is external interference-cancelled using multiuser detection capability, thereby providing a signal of interest.

4. The method of claim 1 further comprising:
   equalizing the signal that is external interference-cancelled based on a known channel response of the target system, thereby providing estimates of data symbols transmitted by the target system;
   de-spreading the estimates of data symbols transmitted by the target system pursuant to a known spreading code of the target system; and
   decoding the estimates of data symbols transmitted by the target system, according to transmitter encoding of the target system, thereby providing a signal of interest.

5. The method of claim 1 further comprising:
   demodulating the signal that is external and internal interference-cancelled using multiuser detection capability, thereby providing a signal of interest.

6. The method of claim 1 further comprising:
   equalizing the signal that is external and internal interference-cancelled based on a known channel response of the target system, thereby providing estimates of data symbols transmitted by the target system;
   de-spreading the estimates of data symbols transmitted by the target system pursuant to a known spreading code of the target system; and
   decoding the estimates of data symbols transmitted by the target system, according to transmitter encoding of the target system, thereby providing a signal of interest.

7. The method of claim 1 wherein equalizing, de-spreading, determining, re-spreading, re-applying, and subtracting are repeated a number of times for at least one of the target system and the interfering system based on a predefined rule of iteration.

8. The method of claim 1 wherein each received system has the same known spreading code.

9. The method of claim 1 wherein the target system and each interfering system is a multicarrier code division multiple access (MC-CDMA) system having a known number of total users, and each system has the same known spreading code.

10. The method of claim 1 wherein de-spreading is preceded by de-mapping the estimates of the data symbols from their subcarriers, and re-spreading is followed by re-mapping the actual data symbol estimates to their subcarriers.

11. An interference cancellation system adapted to receive a signal in a multicarrier communication application, the signal including content from a target system as well as an interfering system, the system comprising:
- a channel equalizer module adapted to equalize the received signal based on a known channel response of the interfering system, thereby providing estimates of data symbols transmitted by the interfering system;
- a de-spreading module adapted to de-spread the estimates of the data symbols pursuant to a known spreading code of the interfering system;
- a symbol decision module adapted to determine values for actual data symbols transmitted by the interfering system based on the estimated data symbols, thereby providing a vector of actual data symbol estimates for the interfering system;
- a re-spreading module adapted to re-spread the vector of actual data symbol estimates pursuant to the known spreading code of the interfering system;
- an apply channel module adapted to re-apply the known channel response of the interfering system, thereby providing an estimate of the interfering system signal;
- a subtracting module adapted to subtract the estimate of the interfering system signal from the received signal, thereby providing a signal that is external interference-cancelled;
- a channel equalizer module adapted to equalize the signal that is external interference-cancelled based on a known channel response of the target system thereby providing estimates of data symbols transmitted by the target system;
- a de-spreading module adapted to de-spread the estimates of data symbols transmitted by the target system pursuant to a known spreading code of the target system;
- a symbol decision module adapted to determine values for actual data symbols transmitted by the target system based on the estimated data symbols, thereby providing a vector of actual data symbol estimates for the target system;
- a re-spreading module adapted to re-spread the vector of actual data symbol estimates pursuant to the known spreading code of the target system;
- an apply channel module adapted to re-apply the known channel response of the target system, thereby providing an estimate of the target system signal; and
- a subtracting module adapted to subtract the estimate of the target system signal from the signal that is external interference-cancelled, thereby providing a signal that is external and internal interference-cancelled.

12. The system of claim 11, further comprising:
an orthogonal frequency division multiplexing (OFDM) de-modulation section adapted to remove a cyclic prefix from the received signal, and to compute an FFT of the received signal to generate a frequency domain representation of the received signal that can be provided to the equalization module for subsequent processing.

13. The system of claim 11 further comprising:
a detection module adapted to demodulate the signal that is external interference-cancelled using multiuser detection capability, thereby providing a signal of interest.

14. The system of claim 11 further comprising:
a decoding module adapted to decode the estimates of data symbols transmitted by the target system, according to transmitter encoding of the target system, thereby providing a signal of interest.

15. The system of claim 11 further comprising:
a detection module adapted to demodulate the signal that is external and internal interference-cancelled using multiuser detection capability, thereby providing a signal of interest.

16. The system of claim 11 further comprising:
a channel equalizer module adapted to equalize the signal that is external and internal interference-cancelled based on a known channel response of the target system, thereby providing estimates of data symbols transmitted by the target system;
a de-spreading module adapted to de-spread the estimates of data symbols transmitted by the target system pursuant to a known spreading code of the target system; and
a decoding module adapted to decode the estimates of data symbols transmitted by the target system, according to transmitter encoding of the target system, thereby providing a signal of interest.

17. The system of claim 11 wherein the target system and each interfering system is an MC-CDMA system having a known number of total users, and each system has the same known spreading code.

18. The system of claim 11 wherein a de-mapping module de-maps the estimates of the data symbols from their subcarriers prior to applying the estimates to the de-spreading module, and a re-mapping module re-maps the actual data symbol estimates provided by the re-spreading module to their subcarriers.

19. An interference cancellation system adapted to receive a signal in a multicarrier communication application, the signal including content from a target system as well as an interfering system, the system comprising:
- a de-spreading module adapted to de-spread estimates of data bits transmitted by the interfering system pursuant to a known spreading code of the interfering system;
- a decision module adapted to determine values for actual data bits transmitted by the interfering system based on the estimated data bits, thereby providing a vector of actual data bit estimates for the interfering system;
- a re-generate signal module adapted to re-spread the vector of actual data bit estimates pursuant to the known spreading code of the interfering system, and to re-apply a known channel response, thereby providing an estimate of the interfering system signal;
- a de-spreading module adapted to de-spread estimates of data bits transmitted by the target system pursuant to a known spreading code of the target system;
- a decision module adapted to determine values for actual data bits transmitted by the target system based on the estimated data bits, thereby providing a vector of actual data bit estimates for the target system; and a re-generate signal module adapted to re-spread the vector of actual data bit estimates pursuant to the known spreading code of the target system, and to re-apply a known channel response, thereby providing an estimate of the target system signal.

20. The system of claim 19 further comprising:

a subtracting module adapted to subtract the estimate of the interfering system signal from the received signal, thereby providing a signal that is external interference-cancelled.

* * * * *

UNITED STATES PATENT AND TRADEMARK OFFICE
CERTIFICATE OF CORRECTION

PATENT NO. : 7,428,261 B2
APPLICATION NO. : 10/482599
DATED : September 23, 2008
INVENTOR(S) : Diane G. Mills, Michael J. Kotrlik and Kari M. Karwedsky It is certified that error appears in the above-identified patent and that said Letters Patent is hereby corrected as shown below:

Column 8
Line 52, delete " $c=[c_1 \ldots c_L]^T$ ", insert -- $\mathbf{c} = \begin{bmatrix} c_1 & \ldots & c_L \end{bmatrix}^T$ --

Column 15
Line 67, delete " $\tilde{s}_{1,k'\neq k} = C_{1,k'\neq k}{}^T \tilde{d}_{1,k'\neq k}$ ", insert -- $\tilde{\mathbf{s}}_{1,k'\neq k} = \mathbf{C}_{1,k'\neq k}^T \tilde{\mathbf{d}}_{1,k'\neq k}$ --

Column 16
Line 5, delete " $\tilde{r}_{1,k'\neq k} = H_1 C_{1,k'\neq k}{}^T \tilde{d}_{1,k'\neq k}$ ", insert -- $\tilde{\mathbf{r}}_{1,k'\neq k} = \mathbf{H}_1 \tilde{\mathbf{s}}_{1,k'\neq k}$ $\tilde{\mathbf{r}}_{1,k'\neq k} = \mathbf{H}_1 \mathbf{C}_{1,k'\neq k}^T \tilde{\mathbf{d}}_{1,k'\neq k}$ --

Line 12, delete

" $\hat{r}_{1,k} = H_1 C_1^T d_1 - H_1 C_{1,k'\neq k}{}^T \tilde{d}_{1,k'\neq k} + H_2 C_2^T d_2 - H_2 C_2^T \tilde{d}_2 + n$ ", insert -- $\hat{\mathbf{r}}_{1,k} = \mathbf{H}_1 \mathbf{C}_1^T \mathbf{d}_1 - \mathbf{H}_1 \mathbf{C}_{1,k'\neq k}^T \tilde{\mathbf{d}}_{1,k'\neq k} + \mathbf{H}_2 \mathbf{C}_2^T \mathbf{d}_2 - \mathbf{H}_2 \mathbf{C}_2^T \tilde{\mathbf{d}}_2 + \mathbf{n}$ --

Line 13, delete

" $\hat{r}_{1,k} = H_1(C_1^T d_1 - C_{1,k'\neq k} \tilde{d}_{1,k'\neq k}) + H_2 C_2^T (d_2 - \tilde{d}_2) + n$ ", insert -- $\hat{\mathbf{r}}_{1,k} = \mathbf{H}_1 \left( \mathbf{C}_1^T \mathbf{d}_1 - \mathbf{C}_{1,k'\neq k}^T \tilde{\mathbf{d}}_{1,k'\neq k} \right) + \mathbf{H}_2 \mathbf{C}_2^T \left( \mathbf{d}_2 - \tilde{\mathbf{d}}_2 \right) + \mathbf{n}$ --

Signed and Sealed this

Fourth Day of May, 2010

David J. Kappos
*Director of the United States Patent and Trademark Office*

CERTIFICATE OF CORRECTION (continued)
U.S. Pat. No. 7,428,261 B2

Line 20, delete

"$\hat{s}_{1,k} = G_1 H_1 (C_1^T d_1 - C_{1,k'\neq k} \tilde{d}_{1,k'\neq k}) + G_1 H_2 C_2 (d_2 - \tilde{d}_2) + G_1 n$", insert -- $\hat{s}_{1,k} = G_1 H_1 (C_1^T d_1 - C_{1,k'\neq k}^T \tilde{d}_{1,k'\neq k}) + G_1 H_2 C_2^T (d_2 - \tilde{d}_2) + G_1 n$ --

Line 24, delete

"$\hat{d}_{1,k} = C_1 G_1 H_1 (C_1^T d_1 - C_{1,k'\neq k}^T \tilde{d}_{1,k'\neq k}) + C_1 G_1 H_2 C_2^T (d_2 - \tilde{d}_2) + C_1 G_1 n$", insert -- $\hat{d}_{1,k} = C_1 G_1 H_1 (C_1^T d_1 - C_{1,k'\neq k}^T \tilde{d}_{1,k'\neq k}) + C_1 G_1 H_2 C_2^T (d_2 - \tilde{d}_2) + C_1 G_1 n$ --

Line 29, delete "$s_1 = C_1^T d_1 = c_{1,k}^T d_{1,k} + C_{1,k'\neq k}^T d_{1,k'\neq k}$", insert -- $s_1 = C_1^T d_1 = c_{1,k}^T d_{1,k} + C_{1,k'\neq k}^T d_{1,k'\neq k}$ --

Line 35, delete

"$\hat{d}_{1,k} = C_1 G_1 H_1 c_{1,k}^T d_{1,k} + C_1 G_1 H_1 C_{1,k'\neq k}^T (d_{1,k'\neq k} - \tilde{d}_{1,k'\neq k}) + C_1 G_1 H_2 C_2 (d_2 - \tilde{d}_2) + C_1 G_1 n$", insert -- $\hat{d}_{1,k} = C_1 G_1 H_1 c_{1,k}^T d_{1,k} + C_1 G_1 H_1 C_{1,k'\neq k}^T (d_{1,k'\neq k} - \tilde{d}_{1,k'\neq k}) + C_1 G_1 H_2 C_2^T (d_2 - \tilde{d}_2) + C_1 G_1 n$ --

Line 42, delete "$C_1 G_1 H_1 c_{1,k}^T$", insert -- $C_1 G_1 H_1 c_{1,k}^T$ --

Line 43, delete "$C_1 G_1 H_1 C_{1,k'\neq k}^T$", insert -- $C_1 G_1 H_1 C_{1,k'\neq k}^T$ --